United States Patent [19]

Auerbach et al.

[11] Patent Number: 5,036,122

[45] Date of Patent: Jul. 30, 1991

[54] ADHESIVE COMPOSITIONS

[75] Inventors: Robert A. Auerbach; Doris B. Berry, both of Erie, Pa.

[73] Assignee: Lord Corporation, Erie, Pa.

[21] Appl. No.: 504,728

[22] Filed: Jan. 31, 1990

Related U.S. Application Data

[63] Continuation of Ser. No. 134,991, Dec. 18, 1987, abandoned.

[51] Int. Cl.$^5$ ............................................... C08K 5/32
[52] U.S. Cl. .................................... 524/259; 524/430
[58] Field of Search ......................................... 524/259

[56] References Cited

U.S. PATENT DOCUMENTS

| | | | |
|---|---|---|---|
| 2,444,536 | 7/1948 | Searle | 131/58 |
| 2,462,835 | 3/1949 | Arnold | 514/66 |
| 3,258,389 | 6/1966 | Coleman et al. | 524/236 |
| 4,119,587 | 10/1978 | Jazenski et al. | 524/259 |
| 4,410,601 | 10/1983 | Gaku et al. | 524/259 |
| 4,483,962 | 11/1984 | Sadowski | 524/552 |

FOREIGN PATENT DOCUMENTS 2078770  1/1982  United Kingdom ............... 524/259

*Primary Examiner*—Joseph L. Schofer
*Assistant Examiner*—J. M. Reddick

[57] ABSTRACT

An adhesive composition for bonding metal to natural or synthetic rubber, composed of a latex, an aromatic nitroso compound, and a polymaleimide compound. The adhesive composition may be formed by ballmilling the latex and the polymaleimide compound into a masterbatch of the aromatic nitroso compound. Bonded articles may be formed by applying the adhesive composition to a metal and contacting the metal surface with the rubber to effect bonding.

13 Claims, No Drawings

ADHESIVE COMPOSITIONS

This is a continuation of copending application Ser. No. 07/134,991, filed on Dec. 18, 1987, now abandoned.

BACKGROUND OF THE INVENTION

1. Field of the Invention

The present invention relates to adhesive compositions for bonding metal to rubber. More particularly, the present invention relates to water-based adhesives for bonding metals to vulcanizable rubbers; to methods for making such adhesives; to methods for bonding metals to vulcanizable rubbers using such adhesives; and to the bonded articles produced thereby.

2. Background of the Invention and Relevant Materials

Adhesives used in the bonding of natural and synthetic rubbers to substrates, including metal substrates, commonly employ a solvent base and are generally activated by the vulcanization process. This is, at least in part, because volatile solvents such as toluene and xylene exhibit a high level of compatibility with the classes of compounds that provide the ingredients for such adhesives, and also tend to wet out the substrates effectively.

While solvent-based adhesives generally provide good adhesion, they also possess many undesirable qualities from the viewpoint of health, safety, and environmental quality. The solvents are usually toxic, presenting a health risk to those who come into contact with the solvents; with the adhesives containing the solvents; or with the fumes generated by either.

In addition, the volatility of both the solvents and their fumes presents the risk of fire or explosion during manufacture, packaging, shipping, and use of solvent-based adhesives.

Environmental concerns, especially as reflected in and enforced through state and federal laws and regulations, further detract from the desirability of using solvent-based adhesives.

These problems can be avoided through the use of water-based adhesives, such as those described in SADOWSKI, U.S. Pat. No. 4,483,962. SADOWSKI discloses aqueous adhesive systems which employ a terpolymer latex formed by the emulsion polymerization of 2,3-dichloro-1,3-butadiene and a mixture of at least two different unsaturated monomers copolymerizable therewith.

Unfortunately, while water-based adhesives do not suffer from the health, safety, and environmental impact problems of solvent-based adhesives, they do exhibit performance drawbacks that have significantly limited their range of application. These drawbacks, and particularly lack of adequate holding power, are most evident under conditions of environmental stress, and especially under conditions of heat, moisture, or a combination of both.

Therefore, in high stress applications the benign qualities of water-based adhesives have been outweighed by the need for dependable performance, which has instead dictated the use of solvent-based adhesives notwithstanding their associated problems.

SUMMARY OF THE INVENTION

Dramatic improvements in resistance to environmental stress are demonstrated by an adhesive composition of matter which comprises a blend of a latex, an aromatic nitroso compound, and a polymaleimide compound. The latex is preferably a polymeric conjugated diene, such as a polybutadiene, and may include at least one halogen selected from the group consisting of chlorine, bromine, and iodine. Most preferred are poly-2,3-dichlorobutadiene and poly-1,1,2-trichlorobutadiene.

The aromatic nitroso compound may be a poly-C-nitroso compound, preferably an aromatic dinitroso compound, and is most preferably dinitrosobenzene.

The polymaleimide may be a polymer of a bismaleimide, and preferably comprises at least two maleimide functional groups. Most preferably, the polymaleimide compound has the general formula:

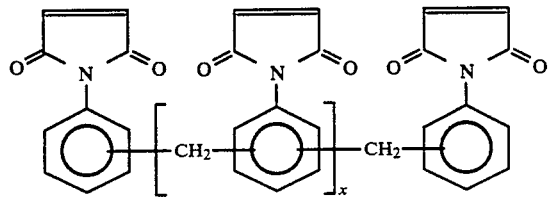

with x being a number from 1 to about 100.

The amount of polybutadiene latex present in the adhesive composition is generally from about 25 to about 40% by weight; preferably from about 30 to about 40% by weight; and most preferably, from about 33 to about 37% by weight. The aromatic nitroso compound is present in the adhesive composition in an amount of from about 40 to about 60% by weight; preferably from about 45 to about 59% by weight; and most preferably from about 50 to about 54% by weight.

Finally, the polymaleimide compound should form from about 1 to about 60% by weight of the total solids content of the adhesive composition. Preferably the polymaleimide compound forms from about 1 to about 45% by weight of total solids, and most preferably from about 1 to about 30% by weight.

In addition to the above components, the adhesive composition of the present invention may include additives, such as fillers, extenders, coloring agents, carbon black, metallic oxides, surfactants, film-forming agents, and viscosity modifiers.

The adhesive composition of the present invention is generally prepared by forming a masterbatch of the aromatic nitroso compound, blending the polymaleimide compound into the masterbatch, and blending the latex into the masterbatch.

Sufficient water may be added to the blend to yield a total solids content of between about 10 and 70 parts by weight.

DESCRIPTION OF PREFERRED EMBODIMENTS

It has now been discovered that, by incorporating a polymaleimide compound into water-based adhesives, dramatic and unexpected improvements in performance can be realized.

The water-based adhesives into which the polymaleimide compounds may be incorporated generally include a latex and an aromatic nitroso compound. The latex is generally a latex of a polymerized conjugated diene, such as polybutadiene, and may be a homopolymer, a copolymer, or a terpolymer as described in SADOWSKI, U.S. Pat. No. 4,483,962, the disclosure of which is hereby expressly incorporated herein by reference.

The polymeric latex is preferably halogenated, and most preferably dihalogenated. While the halogen may be selected from the group consisting of chlorine, bromine, and iodine, chlorine is most preferred. In a particularly preferred embodiment, the latex is poly-2,3-dichlorobutadiene latex or poly-1,1,2-trichlorobutadiene latex.

The aromatic nitroso compound is generally a poly-C-nitroso compound, and may be based on any aromatic hydrocarbon, including benzene, naphthalene, anthracene, and biphenyl. The aromatic hydrocarbon may include from 1 to 3 aromatic nuclei, and contains from 2 to 6 nitroso groups attached to the ring or rings at non-adjacent positions. The aromatic nitroso compound is preferably a nitrosobenzene, and most preferably para-dinitrosobenzene.

It should be noted that the nuclear hydrogen atoms of the aromatic nucleus or nuclei may be substituted, such as with alkyl, alkoxy, cycloalkyl, aryl, arylkyl, alkyryl, aryl amine, aryl nitroso, or amino groups, or with halogen.

The polymaleimide to be incorporated into the adhesive system is of aliphatic or aromatic character and contains at least two maleimide groups. Preferred are such aromatic polymaleimides having from 1 to about 100 aromatic nuclei wherein the maleimide groups are directly attached to each adjacent aromatic ring. Particularly preferred polymaleimide compounds have the formula:

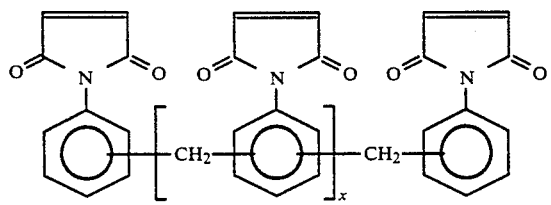

wherein x is from 1 to about 100. Such polymaleimides are common materials of commerce and are sold under different trade names by different companies, such as M-20 polymaleimide by Mitsui Toatsu.

The latex is typically prepared by emulsion polymerization of the desired monomer from about 10 to about 60% weight total solids content. More preferably the emulsion is prepared from about 25 to about 50% weight total solids content, and most preferably the total solids content is from about 40 to about 45% weight.

The amount of latex present in the adhesive composition may be from about 25 to about 40% by weight of the total adhesive formulation. Preferably, the latex is present in amount of from about 30 to about 40% by total weight, with a range of from about 33 to about 37% by total weight being most preferred.

A mill base of aromatic nitroso compound prepared at about 40% total solids content should be present in the adhesive composition in an amount of from about 40 to about 60% by weight of the total adhesive formulation. Preferably, the aromatic nitroso compound should be present in an amount of from about 45 to about 59% by weight of the total adhesive formulation, and most preferably in an amount of from about 50 to about 54% by weight The polymaleimide component should form from about 1 to about 60% by weight of the total solids content. It is preferred to include the polymaleimide in an amount of from about 1 to about 45% by weight of the total solids content, and in a particularly preferred embodiment the polymaleimide is present in the amount of from about 1 to about 30% by Weight of the total solids content.

Water is present in the adhesives in an amount sufficient to yield a final solids content of between about 10 and 70 percent, preferably of between about 20 and 60 percent, and most preferably of between about 30 and 50 percent.

The adhesives of the present invention may optionally include additives, such as fillers, extenders, coloring agents, carbon black, metallic oxides, surfactants, filmforming agents, and viscosity modifiers.

Any suitable method may be employed to blend the components described above into the adhesives of the present invention. Generally, a masterbatch of the nitroso compound will first be prepared using, e.g., a ball mill. The polymaleimide may then be blended into the masterbatch, which is then blended with the latex. Water is added to the blend to produce the desired final solids content.

The resulting adhesive formulation is then applied to a primed metal surface to be bonded. Metals to which natural and synthetic rubber may be bonded according to the present invention include steel, other ferrous alloys, aluminum, etc. The metal surface may then be primed with adhesive primers such as CHEMLOK 205 solvent-based primer or CHEMLOK aqueous primer compositions, both available commercially from Lord Corporation.

After the primer coat has been allowed sufficient time to dry, the adhesive composition of the present invention may be applied by any suitable means, including dipping, spraying, and brushing The adhesively prepared substrate is then permitted to dry, either at ambient conditions or under forced drying conditions, and bonding of the natural or synthetic rubber to the metal surface is carried out under the appropriate conditions of time, temperature, and pressure sufficient to effect bonding The present invention may be further appreciated by reference to the following Examples, which are in no way limiting.

Unless otherwise specified, all amounts are in parts by weight.

EXAMPLE 1

Formulation of Adhesives

| Ingredient | Batch | | | | | | |
| --- | --- | --- | --- | --- | --- | --- | --- |
| | A | B | C | D | E | F | G |
| Dichlorobutadiene latex | 87 | 87 | 87 | 87 | 87 | 87 | 87 |
| para-dinitrosobenzene millbase | 149 | 149 | 149 | 149 | 149 | 149 | 149 |
| M-20 Polymaleimide | 0 | 2.5 | 5 | 10 | 20 | 30 | 40 |
| Water sufficient to yield total solids content of: | 40 | 40 | 40 | 40 | 40 | 40 | 40 |

The para-dinitrosobenzene millbase of Example 1 is prepared from an admixture of the following components: 100 parts of dinitrosobenzene; 5 parts of surfactant Polywet Z1766 (commercially available from Uniroyal, Inc.); 5 parts of an acid scavenger such as a lead salt; 40 parts of carbon black Sterling NS (commercially available from Cabot Corporation); 0.07 parts of sodium hydroxide; 1 part of a dispersant aid such as Marasperse CBOS-3 (commercially available from American Can Company); and sufficient deionized water to bring the millbase to 45% total solids content.

EXAMPLE 2

Primary Adhesions Tests

The adhesive formulations from Example 1 are used to bond solvent-wiped, grit blasted, or zinc phosphatized steel to sulfur vulcanizable natural rubber or synthetic elastomers. The metal parts are primed with either solvent-based primer (CHEMLOK 205), or water-based primer.

Rubber assemblies were cured for appropriate times and at appropriate temperatures as determined by Rheometer, and then tested for peel adhesion by either ASTM D429B or ASTM D429C.

| | Primary Adhesion ASTM D-429-B Modified to 45° Peel Angle | | | | | |
|---|---|---|---|---|---|---|
| Rubber | A | B | C | D | E | F | G |
| I | 44# 100TR | — | 45# 100R | 40# 100R | 45# 100R | 41# 100R | — |
| II | 45# 100TR | — | 50# 100TR | 49# 100TR | 44# 100TR | 50# 100TR | — |
| III | 46#SB 100R | — | 44#SB 100R | 48#SB 100R | 48#SB 100R | 47#SB 100R | — |
| IV | 166# 100R | — | 162# 100R | 166# 100R | 169# 100R | 176# 100R | — |
| V | 105# 100R | — | 110# 100R | 114# 100R | 110# 100R | 111# 100R | — |

Rubber Codes
I = Natural Rubber (high durometer)
II = Natural Rubber (intermediate durometer)
III = Natural Rubber (low durometer)
IV = Styrene-butadiene rubber
V = Neoprene
Adhesion Codes
R = percent rubber adhesion
TR = thin rubber retention
SR = step rubber (heavy)
SB = stock break
RC = rubber-to-cement failure As can be clearly seen, batches A, C, D, E, and F yield similar results in primary adhesion testing. Similar results were also obtained for these batches upon exposure to salt fog for 72 hours; all batches gave 100R.

EXAMPLE 3

Boiling Water Resistance

In the following test, bonded assemblies were prepared by tying the rubber back with wire to expose and stress the bond line and were then submerged in boiling water for 2.0 hours.

All adhesive batches were tested with Natural Rubber I.

| A | B | C | D | E | F | G |
|---|---|---|---|---|---|---|
| 25R,RC | — | 25R,RC | 68R,RC | 100R | 100R | — |

EXAMPLE 4

Hot Tear Resistance

In the following test, the adhesive strength of bonded conical assemblies were tested at a temperature of approximately 280° F., using ASTM D-429-C.

All adhesive batches were tested with a difficult-to-bond NR-SBR blend which typically exhibits poor hot tear strength.

| | | | Hot Tear Resistance | | | |
|---|---|---|---|---|---|---|
| A | B | C | D | E | F | G |
| 130# 33R, RC | 131# 30R, ·RC | 152# 30R, RC | 184# 70R,30TR | 175# 78R,22TR | 194# 83R,RC | 193# 83R, RC |

The above Examples conclusively demonstrate that dramatic improvements in boiling water resistance and in hot tear resistance may be achieved by adding polymaleimide to a water-based, butadiene latex/nitroso adhesive system. Particularly effective are formulations D and E, where total rubber retention is 100%.

COMPARATIVE EXAMPLE 1

Formulation of Adhesives

The adhesive formulations found in the following Table includes Batches H, I, J, K, M and A containing no polymaleimide compound and Batch L containing polymaleimide compound. Batches H, I, J, K and M contain varying amounts of bismaleimide.

| | Batch | | | | | | |
|---|---|---|---|---|---|---|---|
| Ingredient | H | I | J | K | L | M | A |
| Dichlorobutadiene latex | 87 | 87 | 87 | 87 | 87 | 87 | 87 |
| p-Dinitrosobenzene millbase | 149 | 149 | 149 | 149 | 119 | 119 | 149 |
| M-20 Polymaleimide | — | — | — | — | 10 | — | — |
| m-Phenylene-bismaleimide | 2.5 | [5 10 15] [unstable, resulted in phase separation] | | | — | — | — |
| BMI-S Bismaleimide (p,p'-diphenylmethanebismaleimide) | — | — | — | — | — | 10 | — |
| Water sufficient to yield total solids content of: | 40 | 40 | 40 | 40 | 40 | 40 | 40 |

COMPARATIVE EXAMPLE 2

Boiling Water Resistance

Test conditions are identical to those described in Example 3.

| H | I | J | K | L | M | A |
|---|---|---|---|---|---|---|
| — | 17R | 20R | 0R | 100R | 13R | 25R |

As can be clearly seen, Batch L yields 100% rubber adhesion while the other batches containing the bismaleimide yield unacceptable rubber adhesion. In fact, Batches H, I, J, K and M which included bismaleimide yielded poorer rubber adhesion than did Batch A which contained no bismaleimide.

EXAMPLE 5

Effect of Polymaleimide Level

The Table on the following page demonstrate the effects of increasing amounts of polymaleimide on primary adhesion, boiling water resistance, and salt fog resistance for a number of elastomers boded to steel. The effect of maleimide level is most significant in terms of boiling water resistance with high durometer natural rubber. Primary adhesion and salt fog tests are not discriminating, as demonstrated by the fact that performance of the control formulation containing no polymaleimide is satisfactory in those tests.

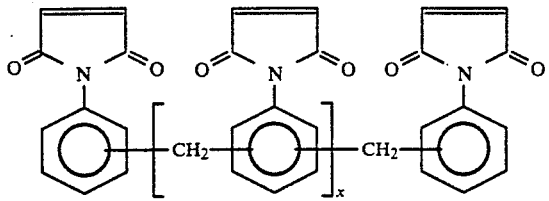

wherein x is a number from 1 to about 100.

7. The adhesive composition as defined in claim 1, wherein said latex is a polybutadiene latex.

| Elastomer | Test ASTM D429-B, C | Screening Study: Effect of M20 in EP4987-1 Parts M-20 on 100 Parts Adhesive Solids | | | | |
|---|---|---|---|---|---|---|
| | | 0 | 5 | 10 | 20 | 30 |
| Natural Rubber Durometer 62 | Primary Adhesion | | | | | |
| | 0' prebake | 76# 66SR,34TR | 90# 83R,17TR | 83# 100SR | 90# 100SR | 68# 66SR,34TR |
| | 5' prebake | 44# 100TR | 46# 100TR | 45# 100TR | 47# 100TR | 29# 100TR |
| | Boiling Water (2 hr.) | 25R,RC | 25R,RC | 68R,RC | 100R | 100R |
| | Salt fog (72 hr.) | 100R | 100R | 100R | 100R | 100R |
| Natural Rubber Durometer 47 | Primary Adhesion | | | | | |
| | 0' prebake | 45# 100TR | 41# 100TR | 40# 100TR | 46# 100TR | 50# 100TR |
| | 5' prebake | 45# 100TR | 47# 100TR | 53# 100TR | 49# 100TR | 46# 100TR |
| | Boiling Water (2 hr.) | 100R | 100R | 100R | 100R | 100R |
| Natural Rubber Durometer 42 | Primary Adhesion | 46# 100R,SB | 44# 100R,SB | 48# 100R,SB | 47# 100R,SB | 47# 100R,SB |
| Styrene-Butadiene Rubber | Primary Adhesion | 166# 100R,SB | 162# 100R,SB | 166# 100R,SB | 169# 100R,SB | 176# 100R,SB |
| Neoprene | Primary Adhesion | 105# 100R | 110# 100R | 114# 100R | 110# 100R | 111# 100R |

Code:
R = Percent rubber retention
TR = thin rubber retention
SR = step rubber (heavy)
SB = stock break
RC = rubber-to-cement failure Naturally, while the present invention has been described by reference to certain specific means, methods, and materials its scope is not to be considered limited thereby, but extends to any and all equivalent means, methods, and materials by which the present invention may be practiced.

What we claim is:

1. An aqueous adhesive composition of matter comprising a blend of:
   (a) a latex of a polymerized conjugated diene;
   (b) a poly-C-nitroso compound; and
   (c) a polymaleimide compound which is a polymer of a bismaleimide.

2. The adhesive composition as defined in claim 1, wherein said polymeric conjugated diene is polybutadiene, and wherein said polybutadiene comprises at least one halogen selected from the group consisting of chlorine, bromine, and iodine.

3. The adhesive composition as defined in claim 2, wherein said polybutadiene is selected from the group consisting of poly-2,3-dichlorobutadiene and poly-1,1,2-trichlorobutadiene.

4. The adhesive composition as defined in claim 1, wherein said poly-C-nitroso compound is an aromatic dinitroso compound.

5. The adhesive composition as defined in claim 4, wherein said aromatic dinitroso compound is dinitrosobenzene.

6. The adhesive composition as defined in claim 1, wherein said polymaleimide compound has the general formula:

8. The adhesive composition as defined in claim 7, wherein said polybutadiene latex comprises a polybutadiene having at least one halogen selected from the group consisting of chlorine, bromine, and iodine; and said poly-C-nitroso compound is dinitrosobenzene.

9. The adhesive composition as defined in claim 8, wherein said polybutadiene latex is selected from the group consisting of poly-2,3-dichlorobutadiene and poly-1,1,2-trichlorobutadiene, said dinitrosobenzene is para-dinitrosobenzene, and said polymaleimide compound has the general formula:

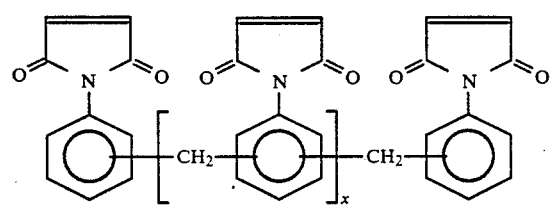

wherein x is a number from 1 to about 100.

10. The adhesive composition as defined in claim 8, wherein the amount of said polybutadiene latex present in said adhesive composition is from about 25 to about 40% by weight; the amount of said dinitrosobenzene present in said adhesive composition is from about 40 to about 60% by weight; and the amount of said polymaleimide compound present in said adhesive composition is from about 1 to about 60% by weight, of total solids content.

11. The adhesive composition as defined in claim 10, wherein the amount of said polybutadiene latex present in said adhesive composition is from about 30 to about 40% by weight; the amount of said dinitrosobenzene present in said adhesive composition is from about 45 to about 59% by weight; and the amount of said polymaleimide present in said adhesive composition is from about 1 to about 45% by weight, of total solids content.

12. The adhesive composition as defined in claim 11, wherein the amount of said polybutadiene latex present in said adhesive composition is from about 33 to about 37% by weight; the amount of said dinitrosobenzene present in said adhesive composition is from about 50 to about 54% by weight; and the amount of said polymaleimide present in said adhesive composition is from about 1 to about 30% by weight, of total solids content.

13. The adhesive composition as defined by claim 7, further comprising additives selected from the group consisting of fillers, extenders, coloring agents, metallic oxides, surfactants, film-forming agents, and viscosity modifiers.

* * * * *